US012698160B2

(12) United States Patent
Youn et al.

(10) Patent No.: US 12,698,160 B2
(45) Date of Patent: Aug. 4, 2026

(54) POWDER FEEDING DEVICE

(71) Applicant: SK On Co., Ltd., Seoul (KR)

(72) Inventors: Yung Sup Youn, Daejeon (KR); Min Chan Kwon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 107 days.

(21) Appl. No.: 18/929,781

(22) Filed: Oct. 29, 2024

(65) Prior Publication Data

US 2025/0197123 A1 Jun. 19, 2025

(30) Foreign Application Priority Data

Dec. 13, 2023 (KR) ...................... 10-2023-0180740
Apr. 24, 2024 (KR) ...................... 10-2024-0054846

(51) Int. Cl.
B65D 33/14 (2006.01)
B65G 33/14 (2006.01)
H01M 4/04 (2006.01)

(52) U.S. Cl.
CPC ........... B65G 33/14 (2013.01); H01M 4/0435 (2013.01)

(58) Field of Classification Search
CPC . B65G 33/14; B65G 53/4633; H01M 4/0435; H01M 4/0409; H01M 4/0404; B29B 17/02; B29L 2033/18; B29L 2031/03055; B29L 2023/06; B29L 2055/02; B29L 2069/00; B29L 2059/00; B29L 2071/12
See application file for complete search history.

(56) References Cited

U.S. PATENT DOCUMENTS

| | | | | |
|---|---|---|---|---|
| 3,710,983 | A * | 1/1973 | Ricciardi ............ | B01F 27/1142 |
| | | | | 222/141 |
| 4,098,649 | A * | 7/1978 | Redker .................... | C10B 7/10 |
| | | | | 201/2.5 |
| 4,206,713 | A * | 6/1980 | Ryason ................... | C10B 47/44 |
| | | | | 110/232 |
| 5,314,090 | A * | 5/1994 | Alexander ............. | B05B 7/144 |
| | | | | 222/196 |
| 5,472,305 | A * | 12/1995 | Ikeda ................. | B65G 53/4633 |
| | | | | 222/368 |
| 6,048,374 | A * | 4/2000 | Green ........................ | C10J 3/10 |
| | | | | 110/235 |
| 6,328,919 | B1 * | 12/2001 | Pham ...................... | B29C 48/76 |
| | | | | 425/208 |
| 8,444,828 | B2 * | 5/2013 | Wolfe ................... | F23G 5/0273 |
| | | | | 201/15 |
| 8,958,727 | B2 * | 2/2015 | Hayashida ......... | G03G 15/0891 |
| | | | | 399/258 |
| 2011/0229213 | A1 * | 9/2011 | Mihara ............. | G03G 15/0877 |
| | | | | 399/263 |
| 2019/0202640 | A1 * | 7/2019 | Chyou ................... | B65G 65/46 |

FOREIGN PATENT DOCUMENTS

KR 10-2165905 B1 10/2020

* cited by examiner

*Primary Examiner* — Vishal Pancholi
(74) *Attorney, Agent, or Firm* — Jones Day

(57) ABSTRACT

A powder feeding device is disclosed. The powder feeding device according to an embodiment of the present disclosure can optimize a state of powder provided to a coater roll.

20 Claims, 5 Drawing Sheets

220(200)

111u(111)

210(200)

121

111d(111)

1231(123)

1232(123)

122

111 }110

121 ⎫
122 ⎬120
123 ⎭

110 ⎫
120 ⎬100

320          310
(300)        (300)

POWDER FEEDING DEVICE

CROSS-REFERENCE TO RELATED APPLICATIONS

This patent document claims the priority and benefits of Korean Patent Application Nos. 10-2023-0180740 and 10-2024-0054846 filed on Dec. 13, 2023 and Apr. 24, 2024, which are incorporated herein by reference in its entirety.

TECHNICAL FIELD

The present disclosure relates to a powder feeding device.

BACKGROUND

In a device that provides powder used in a binder of a secondary battery to a coater roll, maintenance of an appropriate temperature of the powder and uniformity of an amount of powder provided may affect the quality of the binder.

SUMMARY

The present disclosure can be implemented in some embodiments to provide a powder transfer device that maintains a temperature of powder in a predetermined range while transferring the powder.

In addition, the present disclosure can be implemented in some embodiments to provide a powder transfer device that uniformly maintains an amount of powder provided along one direction.

In one aspect of the present disclosure, there is provided a powder feeding device comprising a transfer housing including a transfer housing body configured to extend in a front-rear direction, wherein an inner surface of the transfer housing body forms a shape of a truncated cone and forms a decreasing cross section as it goes rearward; a feeding screw including a feeding screw shaft accommodated in the transfer housing body, the feeding screw shaft being spaced apart from the inner surface of the transfer housing body, and an outer surface of the feeding screw shaft forming a shape of a truncated cone; a feeding housing including a feeding housing wall connected to a lower end of the transfer housing, the feeding housing wall configured to form a closed loop; and a feeder including a feeder shaft positioned in the feeding housing and configured to extend in the front-rear direction, wherein the transfer housing further includes a transfer housing opening that is formed in the transfer housing body and is positioned below the feeding screw shaft, wherein the feeding screw further includes a feeding screw blade configured to protrude from the outer surface of the feeding screw shaft, and wherein the feeder further includes a plurality of feeder blades configured to protrude from an outer surface of the feeder shaft.

According to an embodiment of the present disclosure, there can be provided a powder transfer device that maintains a temperature of powder in a predetermined range while transferring the powder.

According to an embodiment of the present disclosure, there can be provided a powder transfer device that uniformly maintains an amount of powder provided along one direction.

A powder feeding device based on some embodiments of the present disclosure can be widely applied in green technology fields such as electric vehicles, battery charging stations, and other battery-based solar power generation and wind power generation.

A powder feeding device based on some embodiments of the present disclosure can be used in eco-friendly electric vehicles, hybrid vehicles, etc. to prevent climate change by suppressing air pollution and greenhouse gas emissions.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Reference will now be made in detail to embodiments of the present disclosure, examples of which are illustrated in the accompanying drawings. However, the following description is merely an example and does not intended to limit the present disclosure to a specific implementation.

Figure 1:
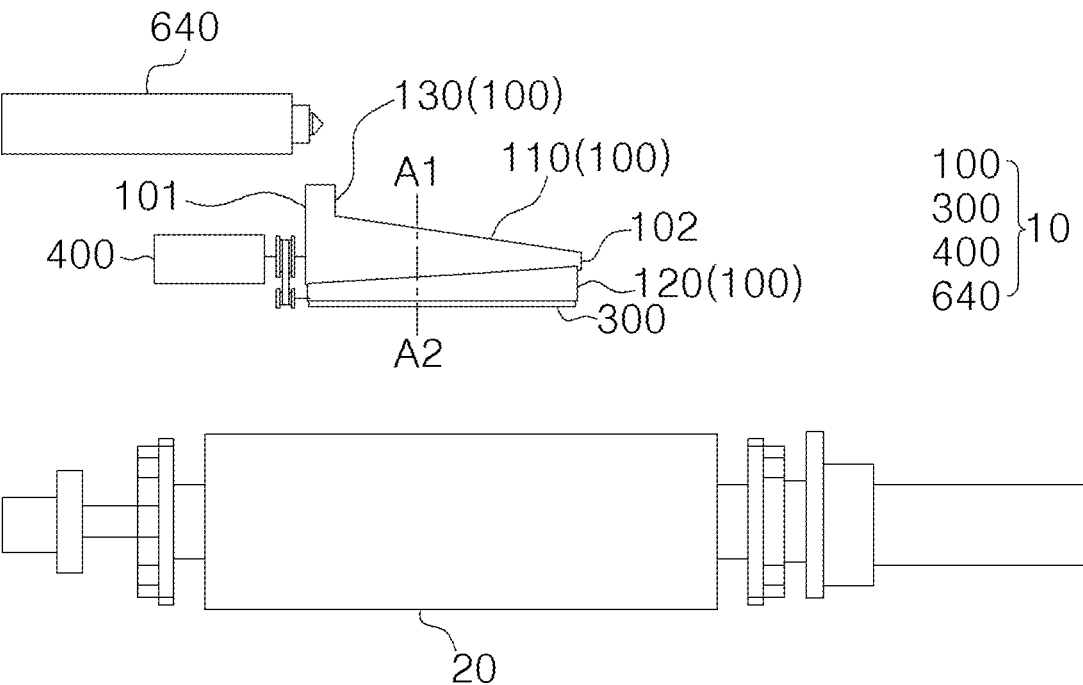
FIG. 1 illustrates a powder feeding device according to an embodiment of the present disclosure.

FIG. 1 illustrates a powder feeding device according to an embodiment of the present disclosure.

Referring to FIG. 1, a powder feeding device 10 may provide powder to a coater roll 20. The coater roll 20 may compress the powder and mold the powder in a film form. The powder in the film form may be coated on a thin metal film.

The powder feeding device 10 may include an insertion unit 640. The insertion unit 640 may accommodate the powder. The insertion unit 640 may provide the powder to a housing unit 100.

The powder feeding device 10 may include the housing unit 100. The housing unit 100 may extend from a front end and lead to a rear end. For example, a housing front end 101 may be the front end of the housing unit 100. For example, a housing rear end 102 may be the rear end of the housing unit 100.

For example, the housing unit 100 may include a housing inlet 130. The housing inlet 130 may be adjacent to the insertion unit 640. For example, the housing inlet 130 may be positioned below the insertion unit 640.

The housing inlet 130 may have the shape of a pipe forming a hollow portion. For example, the hollow portion formed in the housing inlet 130 may be open in an up-down direction. For example, an upper end and a lower end of the housing inlet 130 may be open.

The housing inlet 130 may receive the powder from the insertion unit 640. For example, the powder falling from the insertion unit 640 may be put into the housing inlet 130.

The housing unit 100 may include a transfer housing 110. A front end of the transfer housing 110 may form at least a portion of the housing front end 101. A rear end of the transfer housing 110 may form at least a portion of the housing rear end 102.

For example, the transfer housing 110 may extend rearward from the housing front end 101 and lead to the housing rear end 102. For example, a longitudinal direction of the transfer housing 110 may be a front-rear direction.

The transfer housing 110 may be connected or coupled to the housing inlet 130. For example, the housing inlet 130 may be connected or coupled to the front end of the transfer housing 110. For example, the housing inlet 130 may form a shape extending upward from the transfer housing 110.

The transfer housing 110 may form a hollow portion. The hollow portion formed in the transfer housing 110 may be connected to or communicate with the hollow portion formed in the housing inlet 130.

The transfer housing 110 may form the shape of a cone or a truncated cone. For example, a shape of an inner surface of the transfer housing 110 may be a cone or a truncated cone. The inner surface of the transfer housing 110 may face the hollow portion formed in the transfer housing 110.

For example, an inner cross section of the transfer housing 110 may become smaller as it goes from the housing front end 101 to the housing rear end 102 based on the longitudinal direction of the transfer housing 110.

The housing unit 100 may include a feeding housing 120. The feeding housing 120 may form an elongated or extended shape in one direction. For example, a longitudinal direction of the feeding housing 120 may be parallel to the longitudinal direction of the transfer housing 110.

The feeding housing 120 may be connected or coupled to the transfer housing 110. For example, an upper end of the feeding housing 120 may be connected or coupled to a lower end of the transfer housing 110.

The feeding housing 120 may form a hollow portion. The hollow portion formed in the feeding housing 120 may be connected to or communicate with the hollow portion formed in the transfer housing 110.

The powder feeding device 10 may include a feeder 300. The feeder 300 may be connected or coupled to the feeding housing 120. For example, a portion of the feeder 300 may be accommodated in the feeding housing 120. The feeder 300 may form an elongated or extended shape in one direction. For example, a longitudinal direction of the feeder 300 may be parallel to the longitudinal direction of the feeding housing 120.

The powder feeding device 10 may include an actuator 400. The actuator 400 may be connected or coupled to at least one of a feeding screw 200 (see FIGS. 2 and 3) or the feeder 300.

The actuator 400 may generate a driving force or a rotational force. For example, the actuator 400 may transmit the rotational force to at least one of the feeding screw 200 (see FIGS. 2 and 3) or the feeder 300.

For example, the actuator 400 may transmit the rotational force to the feeding screw 200 (see FIGS. 2 and 3) accommodated in the transfer housing 110. For example, the feeder 300 may receive the rotational force from the feeding screw 200 (see FIGS. 2 and 3).

Figure 2:
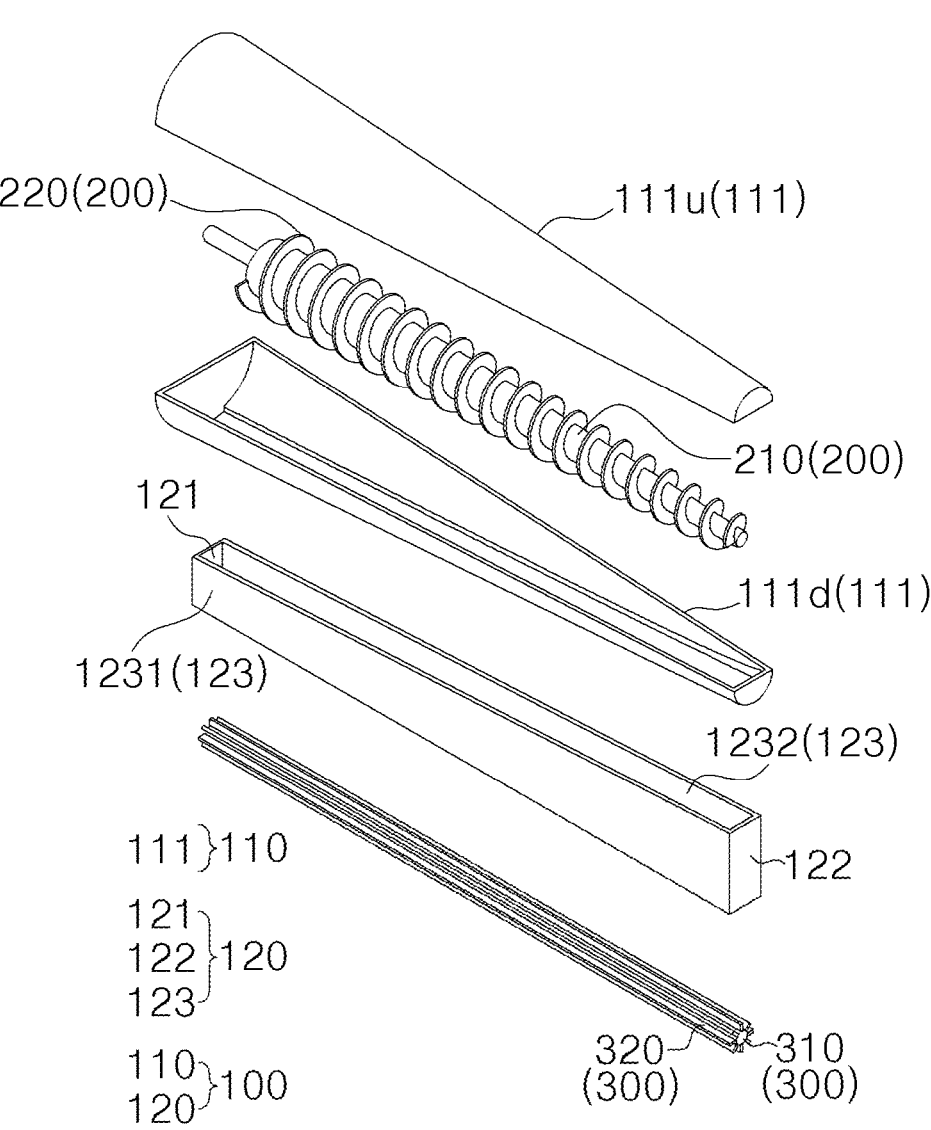
FIGS. 2 and 3 are exploded perspective views of a transfer housing, a feeding housing, a feeding screw, and a feeder when viewed from different directions.
Figure 3:
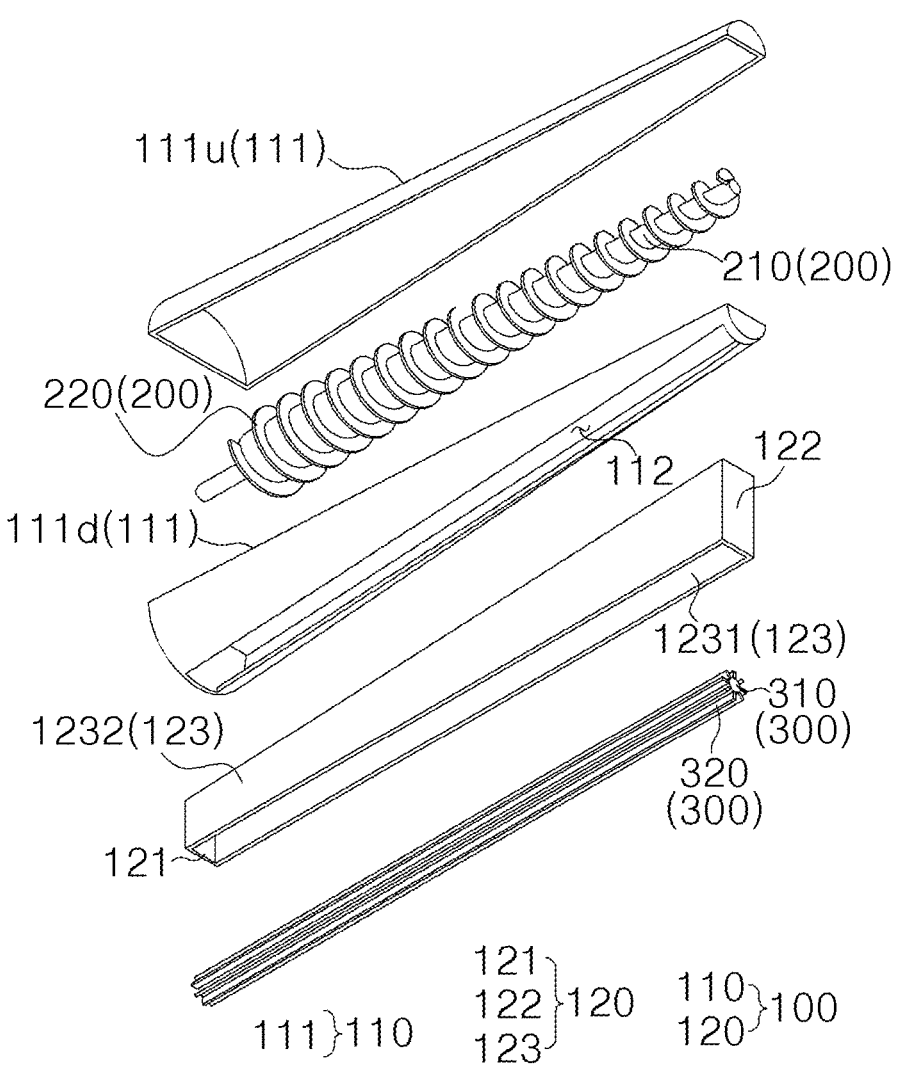

FIGS. 2 and 3 are exploded perspective views of a transfer housing, a feeding housing, a feeding screw, and a feeder when viewed from different directions.

Referring to FIGS. 1 to 3, the powder feeding device 10 (see FIG. 1) may include the feeding screw 200. The feeding screw 200 may be accommodated in the transfer housing 110.

The feeding screw 200 may include a feeding screw shaft 210. At least a portion of the feeding screw shaft 210 may be accommodated in the transfer housing 110.

The feeding screw shaft 210 may form an elongated or extended shape in one direction. For example, the feeding screw shaft 210 may extend rearward from a front end of the feeding screw shaft 210 and lead to a rear end of the feeding screw shaft 210. For example, a longitudinal direction of the feeding screw shaft 210 may be a front-rear direction.

The feeding screw shaft 210 may form the shape of a cone or a truncated cone. For example, an outer surface of the feeding screw shaft 210 may form the shape of a cone or a truncated cone.

For example, the area of a cross section of the outer surface of the feeding screw shaft 210 may vary along an axis of the feeding screw shaft 210. For example, the area of the cross section of the outer surface of the feeding screw shaft 210 may decrease as it goes rearward.

The feeding screw shaft 210 may be connected or coupled to the actuator 400 (see FIG. 1). For example, the front end of the feeding screw shaft 210 may be connected or coupled to the actuator 400 (see FIG. 1).

The feeding screw shaft 210 may receive a rotational force from the actuator 400 (see FIG. 1). For example, the feeding screw shaft 210 may rotate in an azimuthal direction or a circumferential direction based on an axial direction of the feeding screw shaft 210.

The feeding screw 200 may include a feeding screw blade 220. The feeding screw blade 220 may extend or protrude from the outer surface of the feeding screw shaft 210.

For example, the feeding screw blade 220 may form the shape of a thread. For example, the feeding screw blade 220 may form a spiral or helix shape.

For example, the feeding screw blade 220 may form a shape extending from the outer surface of the feeding screw shaft 210 toward the inner surface of the transfer housing 110.

The feeding screw blade 220 may form a pitch angle based on the outer surface of the feeding screw shaft 210. For example, the feeding screw blade 220 may form a pitch angle rearward with respect to the outer surface of the feeding screw shaft 210.

The transfer housing 110 may include a transfer housing body 111. An inner surface of the transfer housing body 111 may face the feeding screw 200. For example, the inner surface of the transfer housing body 111 may face the feeding screw blade 220.

The transfer housing body 111 may be divided into, for example, two parts. For example, the transfer housing 110 may include an upper transfer housing body 111*u* and a lower transfer housing body 111*d*.

The transfer housing body 111 may include or indicate at least one of the upper transfer housing body 111*u* or the lower transfer housing body 111*d*. The upper transfer housing body 111*u* and the lower transfer housing body 111*d* may be coupled or connected to each other.

The transfer housing body 111 may accommodate the feeding screw 200. For example, after the feeding screw 200 is seated on the lower transfer housing body 111*d*, the upper transfer housing body 111*u* may be connected or coupled to the lower transfer housing body 111*d*.

The outer surface of the feeding screw shaft 210 may face the inner surface of the transfer housing body 111. For example, the outer surface of the feeding screw shaft 210 may be spaced apart from the inner surface of the transfer housing body 111. For example, a distance between the feeding screw shaft 210 and the transfer housing body 111 may be constant along the axis of the feeding screw shaft 210.

For example, a space may be formed between the outer surface of the feeding screw shaft 210 and the inner surface of the transfer housing body 111. For example, powder may be transferred rearward in the space formed between the feeding screw shaft 210 and the transfer housing body 111.

The transfer housing 110 may include a transfer housing opening 112. The transfer housing opening 112 may be an opening formed in the transfer housing body 111. For example, the transfer housing opening 112 may be formed in the lower transfer housing body 111*d*.

The transfer housing opening 112 may extend in a longitudinal direction of the transfer housing body 111. For example, the transfer housing opening 112 may be positioned below the feeding screw 200.

For example, the transfer housing opening 112 may form a slit shape. For example, a width of the transfer housing opening 112 may be constant along a longitudinal direction of the transfer housing opening 112. A width direction of the transfer housing opening 112 may be a left-right direction.

For example, the width of the transfer housing opening 112 may vary along the longitudinal direction of the transfer housing 110. For example, the width of the transfer housing opening 112 may increase as it goes from the housing front end 101 (see FIG. 1) to the housing rear end 102 (see FIG. 1). Hence, the powder discharged from the transfer housing opening 112 can be uniformly distributed along the axis of the feeding screw shaft 210.

The feeding housing 120 may include a plurality of walls. For example, the feeding housing 120 may include a feeding housing front wall 121. The feeding housing front wall 121 may form a front face of the feeding housing 120.

For example, the feeding housing 120 may include a feeding housing rear wall 122. The feeding housing rear wall 122 may form a rear face of the feeding housing 120.

For example, the feeding housing 120 may include a feeding housing side wall 123. The feeding housing side wall 123 may connect the feeding housing front wall 121 and the feeding housing rear wall 122.

The feeding housing walls 121, 122, and 123 may include or indicate at least one of the feeding housing front wall 121, the feeding housing rear wall 122, or the feeding housing side wall 123.

The feeding housing walls 121, 122, and 123 may form a closed loop. For example, a first feeding housing side wall 1231, the feeding housing front wall 121, a second feeding housing side wall 1232, and the feeding housing rear wall 122 may be connected sequentially.

For example, a front end of the feeding housing side wall 123 may be connected or coupled to the feeding housing front wall 121. For example, a rear end of the feeding housing side wall 123 may be connected or coupled to the feeding housing rear wall 122.

The feeding housing side wall 123 may be provided as a pair. For example, the feeding housing 120 may include the first feeding housing side wall 1231 and the second feeding housing side wall 1232.

The first feeding housing side wall 1231 and the second feeding housing side wall 1232 may face each other. The feeding housing side wall 123 may include or indicate at least one of the first feeding housing side wall 1231 or the second feeding housing side wall 1232.

An inner surface of the feeding housing side wall 123 may face the feeder 300. For example, the feeder 300 may be positioned between the first feeding housing side wall 1231 and the second feeding housing side wall 1232. For example, the feeder 300 may be positioned between a lower end of the first feeding housing side wall 1231 and a lower end of the second feeding housing side wall 1232.

The inner surface of the feeding housing side wall 123 may form a trapezoidal shape. For example, a height of the inner surface of the feeding housing side wall 123 may increase as it goes rearward.

For example, an upper edge of the inner surface of the feeding housing side wall 123 may be inclined with respect to a lower edge of the inner surface of the feeding housing side wall 123.

The feeding housing 120 may be adjacent to the transfer housing body 111. For example, the feeding housing 120 may be positioned below the transfer housing body 111. For example, the feeding housing 120 may be positioned below the transfer housing opening 112.

The feeding housing 120 may be connected or coupled to the transfer housing body 111. For example, the upper end of the feeding housing 120 may surround the transfer housing opening 112.

The feeder 300 may include a feeder shaft 310. A longitudinal direction of the feeder shaft 310 may be parallel to the longitudinal direction of the feeding screw shaft 210. For example, the feeder shaft 310 may extend rearward from a front end of the feeder shaft 310 and lead to a rear end of the feeder shaft 310.

The feeder shaft 310 may receive a rotational force from the actuator 400 (see FIG. 1). The feeder shaft 310 may rotate. For example, the feeder shaft 310 may rotate in the circumferential direction or the azimuthal direction based on the longitudinal direction of the feeder shaft 310. In other words, the feeder shaft 310 may rotate using an axis or the longitudinal direction of the feeder shaft 310 as a roll axis.

The feeder shaft 310 may be adjacent to the feeding housing 120. For example, the feeder shaft 310 may be positioned at a lower end of the feeding housing 120. For example, the feeder shaft 310 may be positioned between the lower end of the first feeding housing side wall 1231 and the lower end of the second feeding housing side wall 1232.

The feeder 300 may include a feeder blade 320. For example, a longitudinal direction of the feeder blade 320 may be the longitudinal direction of the feeder shaft 310. For example, the feeder blade 320 may extend rearward from a front end of the feeder blade 320 and lead to a rear end of the feeder blade 320.

The feeder blade 320 may protrude from an outer surface of the feeder shaft 310. For example, the feeder blade 320 may extend from the outer surface of the feeder shaft 310.

A plurality of feeder blades 320 may be provided. For example, the feeder 300 may include the plurality of feeder blades 320. The plurality of feeder blades 320 may be arranged in the azimuthal direction based on the axis or the longitudinal direction of the feeder shaft 310.

Figure 4:
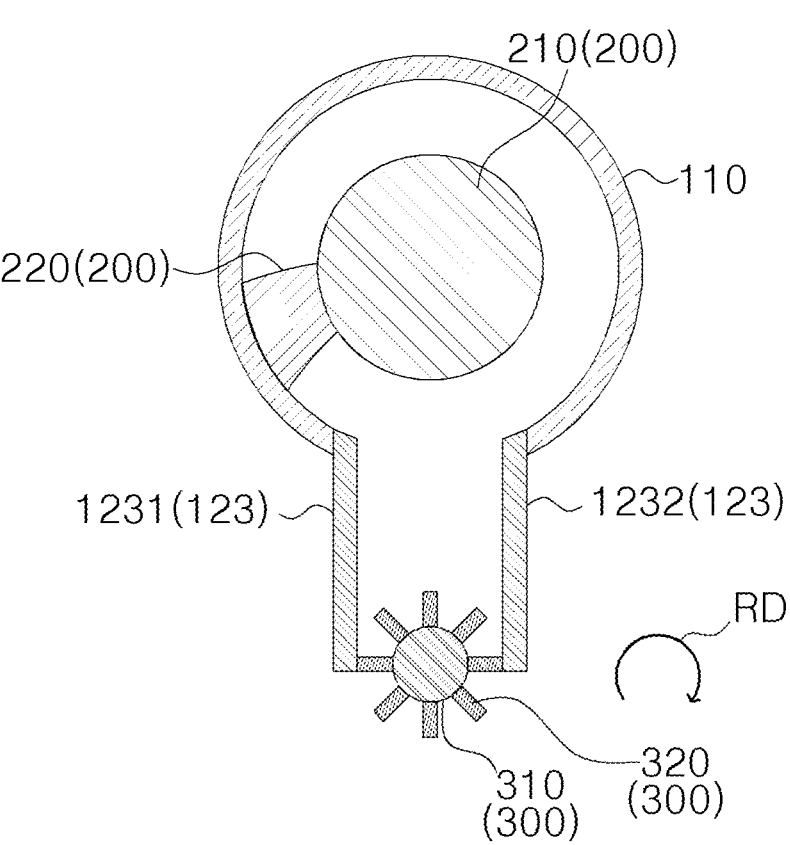
FIG. 4 is a cross-sectional view of a powder feeding device taken along A1-A2 of FIG. 1.

FIG. 4 is a cross-sectional view of a powder feeding device taken along A1-A2 of FIG. 1.

Referring to FIGS. 1 to 4, the feeding screw 200 may rotate in a rotation direction RD. Rotation according to the rotation direction RD may be one of rotations using the axis or the longitudinal direction of the feeding screw shaft 210 as a roll axis.

The powder introduced into the housing inlet 130 may be positioned between the feeding screw 200 and the transfer housing body 111. For example, the powder introduced into the housing inlet 130 may be positioned between the front end of the feeding screw 200 and a front end of the transfer housing body 111.

When the feeding screw 200 rotates, a part of the powder positioned at the front end of the transfer housing body 111 may pass through the transfer housing opening 112 and move to the feeding housing 120.

When the feeding screw 200 rotates, another part of the powder positioned at the front end of the transfer housing body 111 may move rearward by the feeding screw 200. At least a part of the powder that has moved inside the feeding housing 120 may move below the feeding housing 120 by the feeder 300.

Through the processes described above, the powder introduced into the housing unit 100 may be provided to the feeder 300 along an axis of the feeder 300. The feeder 300 may rotate in the rotation direction RD.

For example, the feeder 300 may provide the powder to the coater roll 20. The coater roll 20 may apply at least one of pressure or heat to the powder provided to the coater roll 20.

Figure 5:
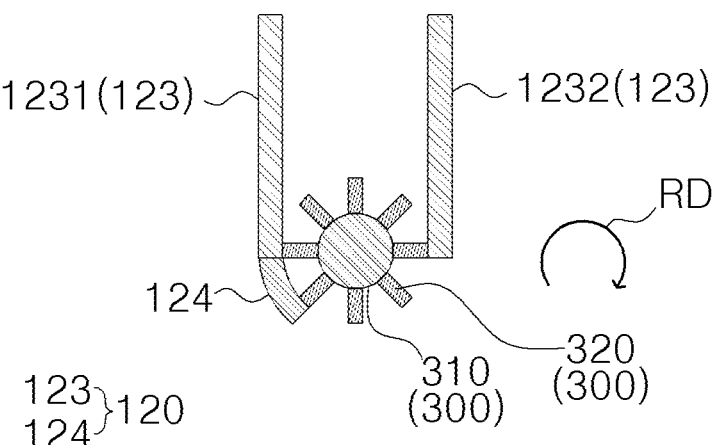
FIG. 5 is a cross-sectional view of a powder feeding device taken along A1-A2 of FIG. 1 and illustrates that a feeding housing guide is connected to a feeding housing side wall.

FIG. 5 is a cross-sectional view of a powder feeding device taken along A1-A2 of FIG. 1 and illustrates that a feeding housing guide is connected to a feeding housing side wall.

Referring to FIG. 5, the feeding housing 120 may include a feeding housing guide 124. The feeding housing guide 124 may be connected or coupled to the feeding housing side wall 123.

For example, the feeding housing guide 124 may be connected or coupled to the first feeding housing side wall 1231. For example, the feeding housing guide 124 may extend downward from the first feeding housing side wall 1231. For example, the feeding housing guide 124 may extend downward from the lower end of the first feeding housing side wall 1231.

A longitudinal direction of the feeding housing guide 124 may be parallel to the longitudinal direction of the feeder shaft 310. For example, the feeding housing guide 124 may form a shape that extends rearward from a front end of the feeding housing guide 124 and leads to a rear end of the feeding housing guide 124.

For example, an inner surface of the feeding housing guide 124 may face the feeder 300. For example, an outer surface of the feeding housing guide 124 may be positioned opposite the inner surface of the feeding housing guide 124.

The inner surface of the feeding housing guide 124 may be concave. For example, a cross section of the inner surface of the feeding housing guide 124 based on the longitudinal direction of the feeding housing guide 124 may form the shape of a circular arc.

The inner surface of the feeding housing guide 124 may face the feeder blade 320. For example, the inner surface of the feeding housing guide 124 may be in contact with the feeder blade 320. For example, at least one of the plurality of feeder blades 320 may be in contact with the inner surface of the feeding housing guide 124.

One of the plurality of feeder blades 320 may be referred to as a "first feeder blade." A direction in which the first feeder blade 320 faces may be a direction from a proximal end portion to a distal end portion of the first feeder blade 320. The proximal end portion of the first feeder blade 320 may be connected to the feeder shaft 310. The distal end portion of the first feeder blade 320 may be positioned opposite the proximal end portion of the first feeder blade 320.

For example, when the feeder 300 rotates in the rotation direction RD in a state in which the first feeder blade 320 faces downward, the feeder blade 320 may be in contact with a lower end of the feeding housing guide 124.

When the feeder 300 rotates in the rotation direction RD in a state in which the feeder blade 320 is in contact with the lower end of the feeding housing guide 124, the distal end portion of the feeder blade 320 may move while being in contact with the inner surface of the feeding housing guide 124. Through this process, the powder can be prevented from falling between the first feeding housing side wall 1231 and the feeder shaft 310.

The powder may be loaded on the first feeder blade 320 in a state in which the first feeder blade 320 faces upward. When the feeder 300 further rotates, the first feeder blade 320 may face downward. When the first feeder blade 320 faces downward, the powder loaded on the first feeder blade 320 may fall.

A plurality of feeding housing guides 124 may be provided. For example, the housing unit 100 may include the plurality of feeding housing guides 124. For example, the housing unit 100 may include a pair of feeding housing guides 124.

The pair of feeding housing guides 124 may be connected or coupled to the feeding housing side wall 123.

For example, one of the pair of feeding housing guides 124 may be connected or coupled to the first feeding housing side wall 1231. Among the pair of feeding housing guides 124, the feeding housing guide 124 connected or coupled to the first feeding housing side wall 1231 may be referred to as a "first feeding housing guide."

For example, the other of the pair of feeding housing guides 124 may be connected or coupled to the second feeding housing side wall 1232. Among the pair of feeding housing guides 124, the feeding housing guide 124 connected or coupled to the second feeding housing side wall 1232 may be referred to as a "second feeding housing guide."

The powder may be loaded on the first feeder blade 320 in a state in which the first feeder blade 320 is in contact with the second feeding housing guide 124. When the feeder 300 further rotates, the first feeder blade 320 may be spaced apart from the second feeding housing guide 124. When the first feeder blade 320 is spaced apart from the second feeding housing guide 124, the powder loaded on the first feeder blade 320 may fall.

Figure 6:
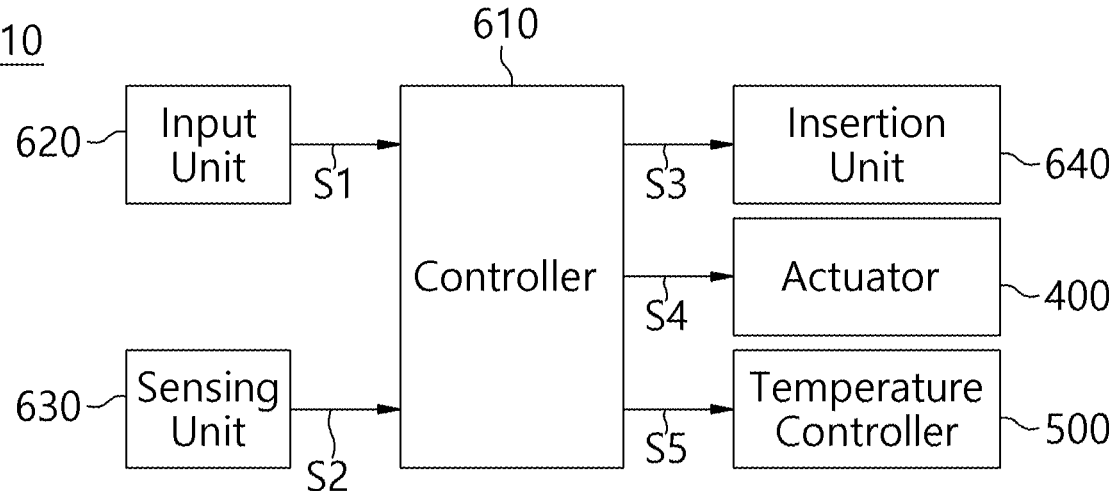
FIG. 6 is a block diagram illustrating a powder feeding device.

FIG. 6 is a block diagram illustrating a powder feeding device.

Referring to FIGS. 1 to 6, the powder feeding device 10 may include a controller 610. The controller 610 may process signals. The controller 610 may perform calculations. The controller 610 may generate output signals S3, S4, and S5 based on input signals S1 and S2.

The input signals S1 and S2 may include at least one of a first signal S1 or a second signal S2. The output signals S3, S4, and S5 may include at least one of a third signal S3, a fourth signal S4, or a fifth signal S5.

The powder feeding device 10 may include an input unit 620. The input unit 620 may obtain an input from a user, etc. The input unit 620 may generate the first signal S1. The first signal S1 may include information on the input obtained by the input unit 620. The first signal S1 may be transmitted to the controller 610.

The powder feeding device 10 may include a sensing unit 630. The sensing unit 630 may generate the second signal S2. The second signal S2 may include information on a measurement value obtained by the sensing unit 630. The second signal S2 may be transmitted to the controller 610.

For example, the sensing unit 630 may measure a flow rate of the powder provided to the housing unit 100. For example, the sensing unit 630 may measure a temperature of the powder.

For example, the sensing unit 630 may be accommodated in the housing unit 100. For example, the sensing unit 630 may be accommodated in the transfer housing body 111. For example, the sensing unit 630 may be connected or coupled to the inner surface of the transfer housing body 111.

For example, the sensing unit 630 may measure the temperature of the powder contained in the housing unit 100. The second signal S2 may include information on the temperature of the powder contained in the housing unit 100.

The degree of fiberization of the powder may vary depending on the temperature of the powder. For example, if the temperature of the powder is between 0° C. and 5° C., a state of the powder may be optimal in terms of the degree of fiberization of the powder.

A plurality of sensing units 630 may be provided. For example, the powder feeding device 10 may include the plurality of sensing units 630. The plurality of sensing units 630 may be arranged in a longitudinal direction of the housing unit 100. For example, the plurality of sensing units 630 may be arranged to be spaced apart from each other in a front-rear direction.

The insertion unit 640 may receive the third signal S3 from the controller 610. The third signal S3 may include information on the flow rate of the powder to be provided by the insertion unit 640 to the housing unit 100. The insertion unit 640 may operate in response to the third signal S3.

The actuator 400 may receive the fourth signal S4 from the controller 610. The fourth signal S4 may include information on a rotation speed of at least one of the feeding screw 200 or the feeder 300. The actuator 400 may operate in response to the fourth signal S4.

The powder feeding device 10 may include a temperature controller 500. The temperature controller 500 may be adjacent to at least one of the insertion unit 640 or the housing unit 100.

For example, the temperature controller 500 may be connected to at least one of the insertion unit 640 or the housing unit 100. For example, the temperature controller 500 may be coupled to at least one of the insertion unit 640 or the housing unit 100.

For example, the temperature controller 500 may control the temperature of the powder contained in the housing unit 100. The temperature controller 500 may include at least one of a cooling member or a heating member.

The temperature controller 500 may receive the fifth signal S5 from the controller 610. The temperature controller 500 may operate in response to the fifth signal S5 to apply heat to the powder or cool the powder.

Only specific examples of implementations of certain embodiments are described. Variations, improvements and enhancements of the disclosed embodiments and other embodiments may be made based on the disclosure of this patent document.

What is claimed is:

1. A powder feeding device comprising:
a transfer housing including a transfer housing body configured to extend in a front-rear direction, wherein an inner surface of the transfer housing body forms a shape of a truncated cone and forms a decreasing cross section as it goes rearward;

a feeding screw including a feeding screw shaft accommodated in the transfer housing body, the feeding screw shaft being spaced apart from the inner surface of the transfer housing body, and an outer surface of the feeding screw shaft forming a shape of a truncated cone;

a feeding housing including a feeding housing wall connected to a lower end of the transfer housing, the feeding housing wall configured to form a closed loop; and a feeder including a feeder shaft positioned in the feeding housing and configured to extend in the front-rear direction, wherein the transfer housing further includes a transfer housing opening that is formed in the transfer housing body and is positioned below the feeding screw shaft, wherein the feeding screw further includes a feeding screw blade configured to protrude from the outer surface of the feeding screw shaft, and wherein the feeder further includes a plurality of feeder blades configured to protrude from an outer surface of the feeder shaft.

2. The powder feeding device of claim 1, wherein the feeding screw blade forms a spiral or helix shape.

3. The powder feeding device of claim 2, wherein the feeding screw blade forms a pitch angle rearward along an axis of the feeding screw shaft.

4. The powder feeding device of claim 1, wherein the transfer housing opening extends in the front-rear direction and forms a slit shape.

5. The powder feeding device of claim 4, wherein a width of the transfer housing opening increases as it goes rearward.

6. The powder feeding device of claim 1, wherein the plurality of feeder blades are arranged to be spaced apart from each other in an azimuthal direction of the feeder shaft.

7. The powder feeding device of claim 6, wherein the feeding housing wall includes:
a feeding housing front wall configured to form a front face of the feeding housing wall;
a feeding housing rear wall configured to form a rear face of the feeding housing wall; and
a feeding housing side wall connected to the feeding housing front wall and the feeding housing rear wall.

8. The powder feeding device of claim 7, wherein the feeding housing side wall includes a first feeding housing side wall and a second feeding housing side wall that face each other and are spaced apart from each other, and
wherein the first feeding housing side wall, the feeding housing front wall, the second feeding housing side wall, and the feeding housing rear wall are connected sequentially.

9. The powder feeding device of claim 8, wherein the feeder shaft is positioned between a lower end of the first feeding housing side wall and a lower end of the second feeding housing side wall.

10. The powder feeding device of claim 8, wherein an inner surface of the feeding housing side wall faces the feeder shaft, and
wherein an upper edge of the inner surface of the feeding housing side wall and a lower edge of the inner surface of the feeding housing side wall form an angle.

11. The powder feeding device of claim 8, wherein an inner surface of the feeding housing side wall faces the feeder shaft, and
wherein the inner surface of the feeding housing side wall forms a trapezoidal shape.

12. The powder feeding device of claim 8, wherein the feeding housing further includes a feeding housing guide extending downward from the first feeding housing side wall, and wherein an inner surface of the feeding housing guide faces the feeder.

13. The powder feeding device of claim 12, wherein the inner surface of the feeding housing guide is concave.

14. The powder feeding device of claim 13, wherein a cross section of the inner surface of the feeding housing guide forms a circular arc shape.

15. The powder feeding device of claim 13, wherein at least one of the plurality of feeder blades is in contact with the inner surface of the feeding housing guide.

16. The powder feeding device of claim 1, further comprising an actuator coupled to at least one of the feeding screw shaft or the feeder shaft, wherein the actuator provides a rotational force to the feeding screw shaft and the feeder shaft.

17. The powder feeding device of claim 1, further comprising a housing inlet configured to extend upward from a front end of the transfer housing body and communicate with a hollow portion formed inside the transfer housing body, wherein a powder is provided inside the transfer housing body through the housing inlet.

18. The powder feeding device of claim 16, further comprising a sensing unit connected to the inner surface of the transfer housing body and configured to measure a temperature of a powder.

19. The powder feeding device of claim 18, further comprising a temperature controller connected to at least one of the transfer housing or the feeding housing, wherein the temperature controller includes at least one of a cooling member or a heating member.

20. The powder feeding device of claim 19, wherein the temperature controller maintains the temperature of the powder between 0° C. and 5° C.

* * * * *